United States Patent
Chaklader

(10) Patent No.: US 6,440,385 B1
(45) Date of Patent: Aug. 27, 2002

(54) HYDROGEN GENERATION FROM WATER SPLIT REACTION

(75) Inventor: Asok C. D. Chaklader, Vancouver (CA)

(73) Assignee: The University of British Columbia, Vancouver (CA)

(*) Notice: Subject to any disclaimer, the term of this patent is extended or adjusted under 35 U.S.C. 154(b) by 23 days.

(21) Appl. No.: 09/637,930

(22) Filed: Aug. 14, 2000

(51) Int. Cl.$^7$ ................................................ C01B 3/08
(52) U.S. Cl. ................................................ 423/657
(58) Field of Search ............................. 423/648.1, 657

(56) References Cited

U.S. PATENT DOCUMENTS

| | | | |
|---|---|---|---|
| 2,533,937 A | * 12/1950 | Hybinette et al. | 423/648.1 |
| 3,716,416 A | 2/1973 | Adlhart et al. | 429/23 |
| 3,966,895 A | 6/1976 | Wilheim | 585/434 |
| 3,985,865 A | 10/1976 | Hohne | 423/657 |
| 4,064,226 A | 12/1977 | Becker et al. | 423/657 |
| 4,072,514 A | 2/1978 | Suzuki | 420/402 |
| 4,356,163 A | 10/1982 | Davidson | 423/648.1 |
| 4,752,463 A | * 6/1988 | Nagira et al. | 423/657 |
| 4,988,486 A | 1/1991 | Harris et al. | 422/191 |
| 5,143,047 A | 9/1992 | Lee | 126/263.05 |
| 5,494,538 A | 2/1996 | Kirillov et al. | 148/420 |
| 5,510,201 A | 4/1996 | Werth | 429/17 |
| 5,514,353 A | 5/1996 | Adlhart | 422/239 |
| 5,593,640 A | 1/1997 | Long et al. | 422/111 |
| 5,728,464 A | 3/1998 | Checketts | 428/403 |
| 5,817,157 A | 10/1998 | Checketts | 48/61 |

FOREIGN PATENT DOCUMENTS

| | | | |
|---|---|---|---|
| EP | 0417278 A1 * | 3/1991 | C01B/3/08 |
| FR | 79 19615 | 3/1981 | C10B/3/08 |
| JP | 1061301 | 3/1989 | C01B/3/06 |

* cited by examiner

*Primary Examiner*—Wayne A. Langel
*Assistant Examiner*—Maribel Medina Sanabria
(74) *Attorney, Agent, or Firm*—Oyen Wiggs Green & Mutala

(57) ABSTRACT

A composite material comprising a mechanical mixture of aluminum oxide(s) and/or aluminum hydroxide(s) and aluminum (Al) metal, which when submerged in water, produces hydrogen gas at or near to neutral pH. The phenomenon has been demonstrated reproducibly. The evolution of hydrogen gas is dependent on several factors, namely, temperature, pH, proportion and particle size of ingredients and mixing conditions. The water split reaction proceeds for the mass ratio of Al to the oxide or hydroxide varying in the entire range up to the 99% of additive(s). The reaction proceeds in a pH range of water, 9>pH>4, and water temperature, from about 10° C. to 90° C.

9 Claims, 4 Drawing Sheets

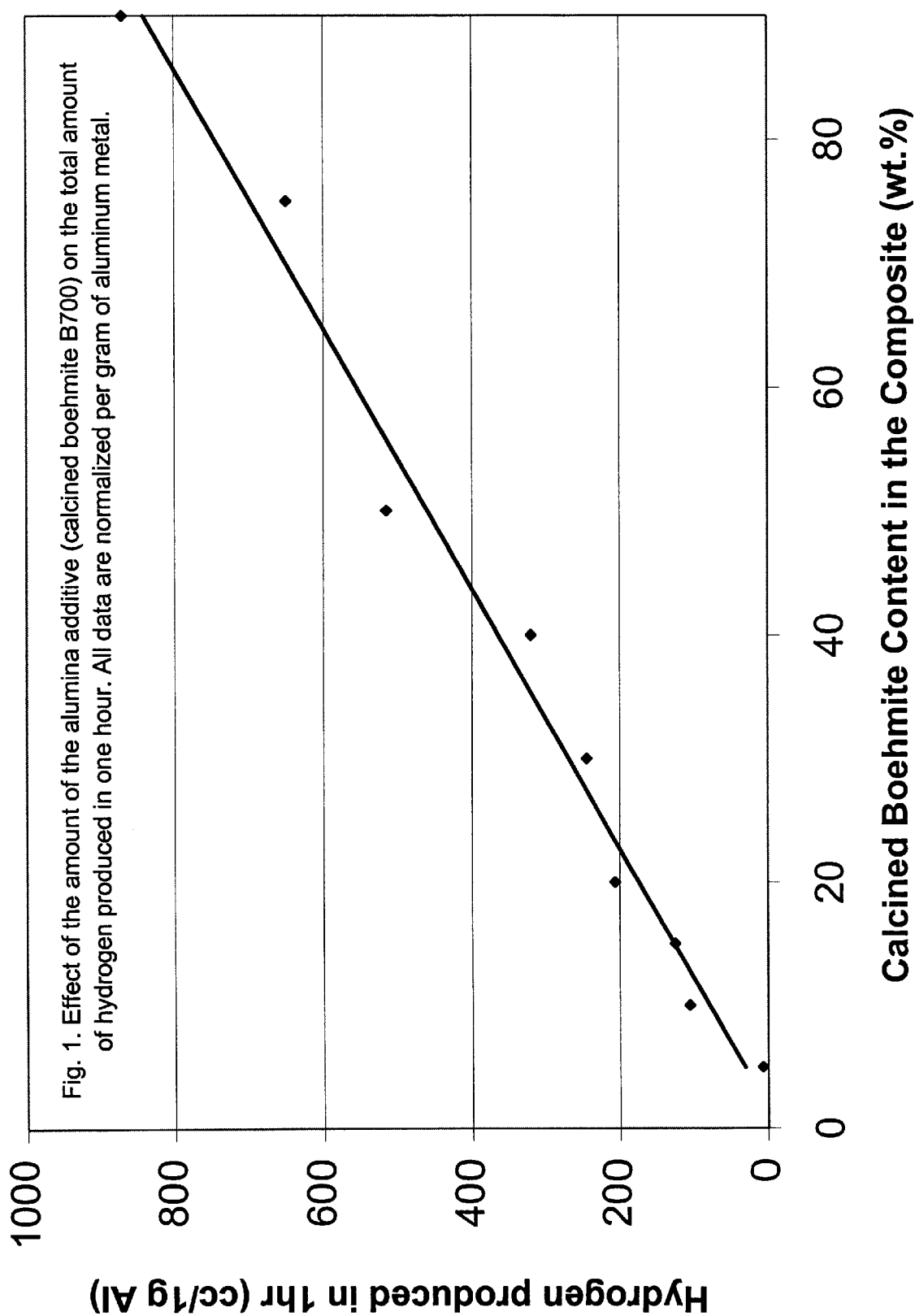
Fig. 1. Effect of the amount of the alumina additive (calcined boehmite B700) on the total amount of hydrogen produced in one hour. All data are normalized per gram of aluminum metal.

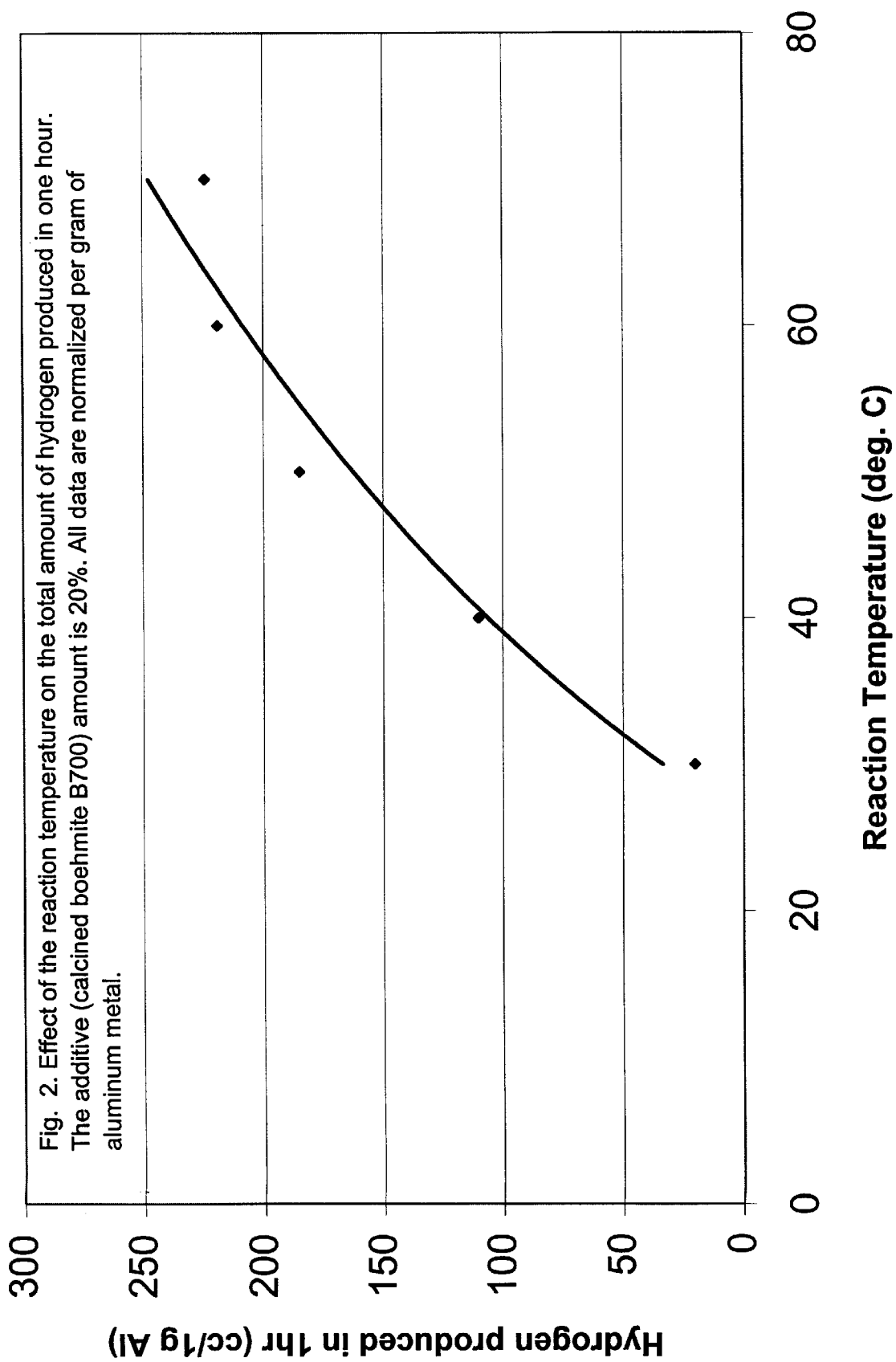
Fig. 2. Effect of the reaction temperature on the total amount of hydrogen produced in one hour. The additive (calcined boehmite B700) amount is 20%. All data are normalized per gram of aluminum metal.

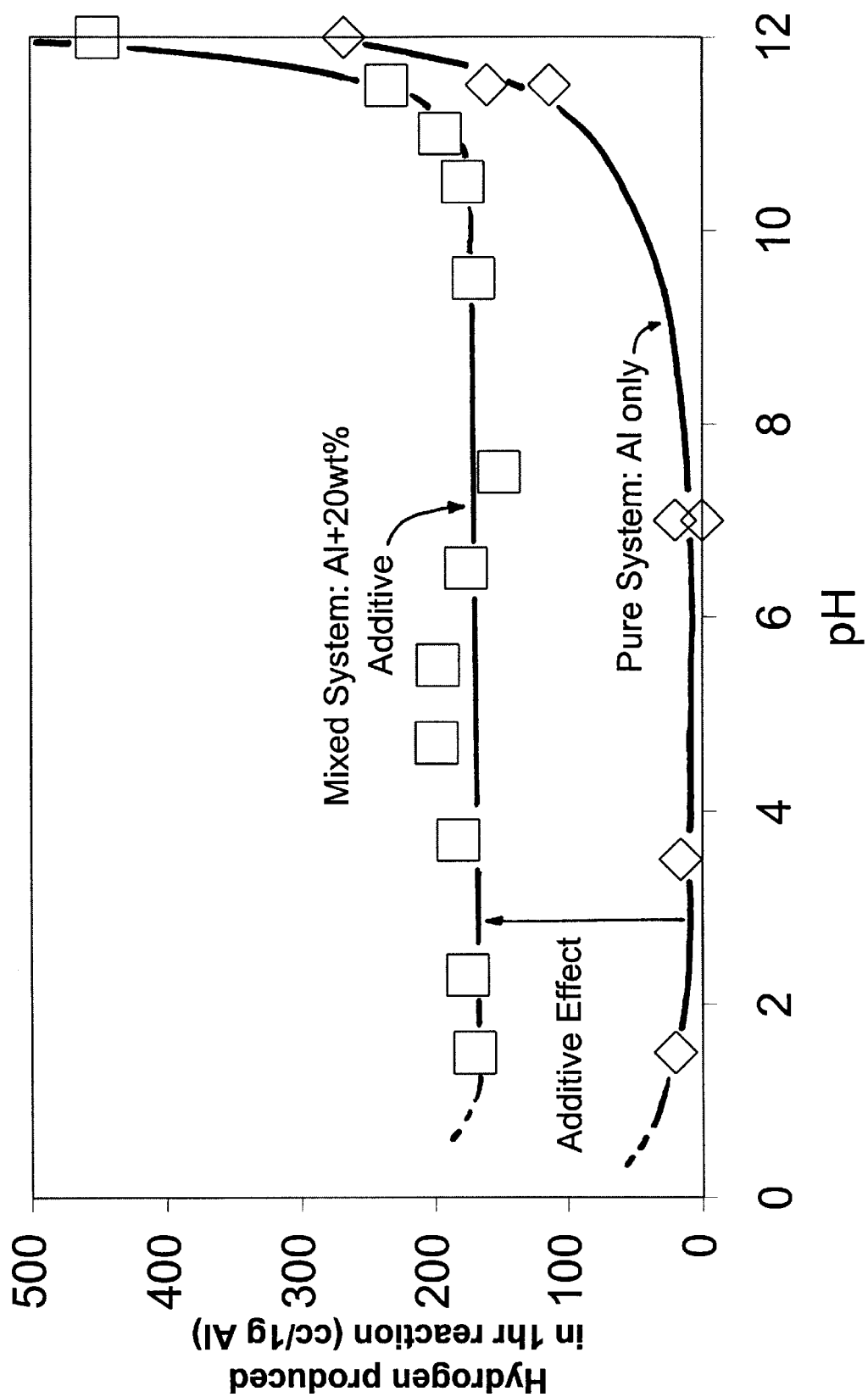
Fig. 3 Amount of hydrogen generated in 1 hr of aluminum-assisted water split reaction, as a function of pH, for pure Al and Al with alumina additive (data normalized to 1g of Al based on Tab. 5 and 6).

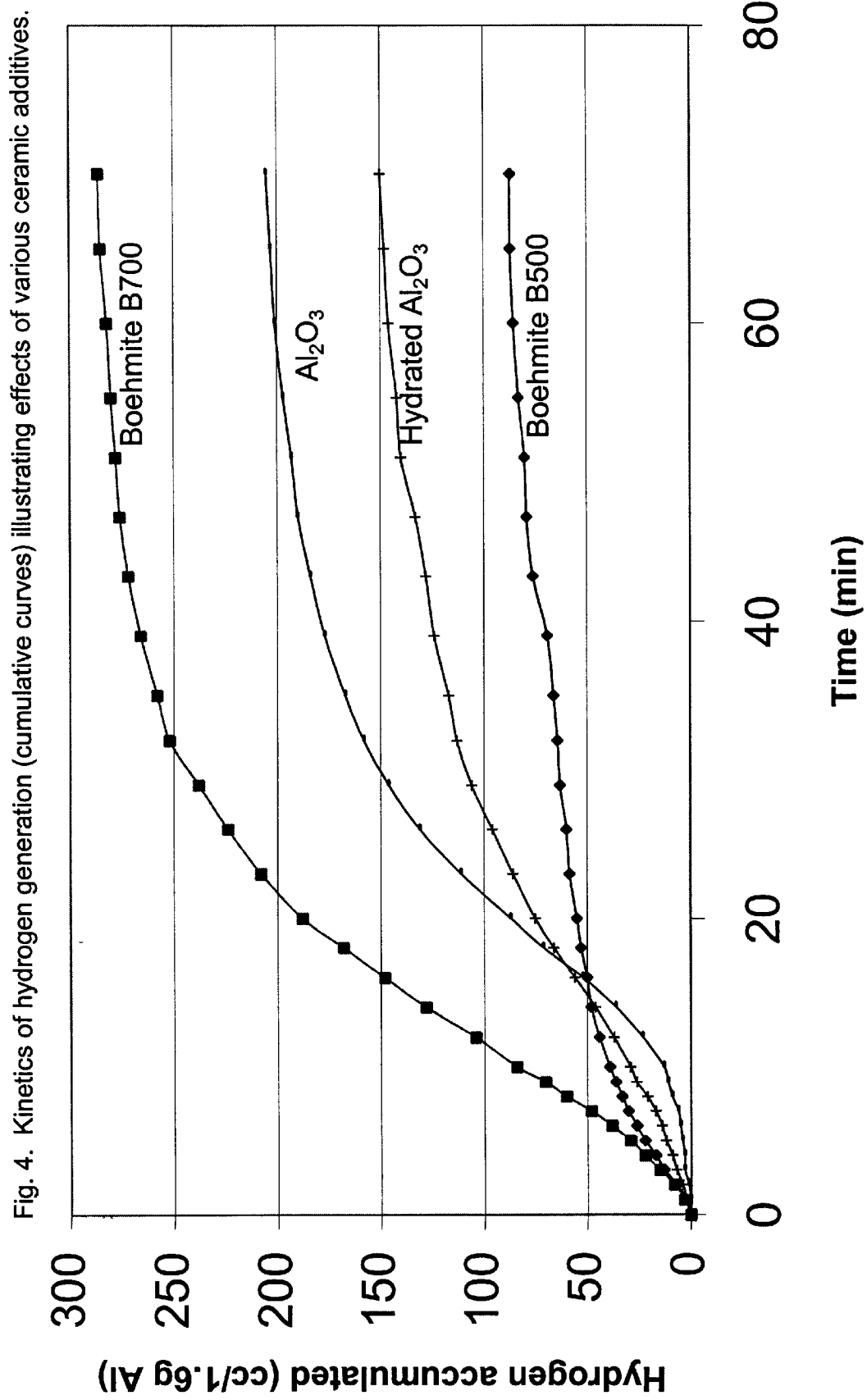
Fig. 4. Kinetics of hydrogen generation (cumulative curves) illustrating effects of various ceramic additives.

HYDROGEN GENERATION FROM WATER SPLIT REACTION

FIELD OF THE INVENTION

This invention relates to a novel and unique method of generating hydrogen from water. More particularly, this invention pertains to a novel method of producing hydrogen from water using metal-ceramic composites, at ambient or elevated temperature and at neutral, or close to neutral, pH.

BACKGROUND OF THE INVENTION

The generation of hydrogen utilizing inexpensive simple processes is becoming increasingly important. The increasing demand for hydrogen arises from the imminent paradigm shift to a hydrogen-based energy economy, such as in hydrogen fuel cells. This shift approaches as the worldwide need for more electricity increases, greenhouse gas emission controls tighten, and fossil fuel reserves wane. The attendant market for fuel generators addresses the near term lack of hydrogen supply infrastructure that is necessary for the proliferation of the hydrogen fuel cell. Hydrogen-based economy is the only long-term, environmentally benign alternative for sustainable growth. Over the last few years it is becoming more apparent that the emphasis on cleaner fuel will lead to use of hydrogen in a significant way. Providing that renewable energy sources, such as hydroelectricity or solar energy, are used to produce hydrogen through decomposition of water, there are no environmental threats produced by the hydrogen economy.

The common method to recover hydrogen from water is to pass electric current through water and thus to reverse the oxygen-hydrogen reaction, i.e. in water electrolysis. Another method involves extraction of hydrogen from fossil fuels, for example from natural gas or methanol. This method is complex and always results in residues, such as carbon dioxide, at best. And there is only so much fossil fuel available. In these reforming methods the resulting hydrogen must be somehow stored and delivered to the user, unless the hydrogen generation is performed "on-board", close to the consumption system. The safe, reliable, low-cost hydrogen storage and delivery is currently one of the bottlenecks of the hydrogen-based economy. The current invention addresses this problem through safe, "on-board/on-demand" production of hydrogen close to the user systems, using simple, safe and pollution-free metal-ceramic composites reacting with water.

This invention relates to a novel method of generating hydrogen from water. Water consists of two elements: oxygen and hydrogen. A relatively large amount of energy is released when these two elements react to form water. This energy may be captured and efficiently converted to electricity in fuel cells. More importantly, nothing else is released when oxygen and hydrogen react to form water. Consequently, the hydrogen-oxygen reaction is potentially a pollution-free source of energy. Although about 20% of air is oxygen, there is no easily accessible, safe source of hydrogen available. The current invention addresses this problem.

There are only a few resources that can produce abundant hydrogen and these include hydrocarbons and water. Of these, the only pollution free source of hydrogen is water. One of the problems that must be addressed before the new hydrogen economy replaces the current "oil/gas/coal/nuclear" economy, is finding a safe, environmentally benign and cost-effective method of generation, storage and distribution of hydrogen. This issue is the primary focus of the present invention.

It is known that some metals produce spontaneously hydrogen in contact with water. These are, for example, alkaline metals such as potassium (K) or sodium (Na). These metals could be used as water-split agents through the simple reaction which proceeds spontaneously once metal is dropped into water:

$$2K+2H_2O \rightarrow 2KOH+H_2 \tag{1}$$

Similar reactions can be written for other alkalis, e.g. Na. Unfortunately the residual hydroxide product (i.e. KOH in the above reaction) causes very high alkalinity of the resulting products, making them corrosive, dangerous to handle and potentially polluting to the environment. As the reaction (1) proceeds spontaneously and violently, the reacting metals must be always protected from undesirable contact with water (i.e. effectively also from air which under normal conditions will contain water vapor). This increases costs of the technology and adds safety and pollution problems. The reaction products are not easy to handle and recycle. Reaction (1) has an advantage in that the reaction products (i.e. KOH) continuously dissolve in the reacting water, and thus allow the reaction to continue until all metal reacts. Similar effect was difficult to achieve with other attractive metals such as aluminum, as in this case the reaction products, i.e. $Al(OH)_3$, tend to deposit on the surface of the reacting metal and thus restrict access of reactants (e.g. water or oxygen) to metal surface, eventually stopping the reaction. This "passivation" phenomenon is a fortunate property of reactive metals such as Al, as it preserves them in substantially corrosion-free state in wide variety of applications, as long as environment is not too acidic or alkaline. At the same time, passivation does not allow to use Al for generating hydrogen from water at close to neutral pH. The presently disclosed invention teaches a simple method preventing formation of the passivation layer of products on the Al surface, and thus allows to use Al for generation of hydrogen from water at close to neutral pH.

The research intensity, and the proportional literature volume pertaining novel means of hydrogen generation and use, is extremely large and increasing in recent years. Below we present the selected patent publications that may have some relationship to the present invention. A number of variants of water split reaction to produce hydrogen have been disclosed in the past, primarily involving alkali metals. Two patents (U.S. Pat. No. 5,817,157 and 5,728,464) that describe a system for the controlled generation of hydrogen from spherical polyethylene-coated Na or NaH pellets have been issued to Jed Checketts [1,2]. The system comprises a container to hold the pellets and water, a hydraulic system for splitting open the pellets, and a hydrogen sensor and computer which provides a feedback loop for activating the pellet splitter. This technology supercedes other patents that have been issued for controlled hydrogen generators that employ alkali metals (U.S. Pat. No. 4,356,163 [3]; 5,514,353 [4]; 3,716,416 [5]) or metal hydrides (U.S. Pat. No. 5,593,640 [6]) or iron (U.S. Pat. No. 5,510,201 [7]) and water. Another patent describes a generator that employs hydrochloric acid and pure metal (U.S. Pat. No. 4,988,486 [8]). Additional patents have been issued for the generation of hydrogen gas in an uncontrolled manner (U.S. Pat. No. 5,143,047 [9]; 5,494,538 [10]; 4,600,661 [11]; 4,072,514 [12]; 4,064,226 [13]; 3,985,865 [14]; and 3,966,895 [15]) in systems comprising mixtures of alkali or alkali earth metals and/or aluminum and water or aqueous salt solutions. Although in one particular case an Al-ceramic composite has been proposed to initiate the water split reaction (JP. Pat. No. 1,061,301 [16]), the ceramic is calcined dolomite, i.e.

calcium/magnesium oxide. Once contacted with water, these oxides cause very substantial increase of pH, which stimulates corrosion of Al with accompanying release of hydrogen. The system has all the disadvantages of water split reaction using alkaline metals, i.e. very high alkalinity and difficult recyclability of the products. In one case, the Mg and Al are mechanically ground together to form a composite material which is then exposed to water (U.S. Pat. No. 4,072,514 [17]). Continuous removal of the passivation layer on aluminum by mechanical means, in order to sustain aluminum assisted water split reaction, has been disclosed in (FR Pat. No. 2,465,683)[18]. This patent describes a method of automatic gas production by reaction of alkaline solution with metal-incorporating feeding without interruption of reaction and continuous metal cleaning applicable in producing hydrogen for energy source. For hydrogen production aluminum on sodium hydroxide solution in water was used.

SUMMARY OF INVENTION

A composite material comprising a mechanical mixture of aluminum oxide(s) and/or aluminum hydroxide(s) and aluminum (Al) metal, which when submerged in water, produces hydrogen gas at or near to neutral pH. The phenomenon has been demonstrated reproducibly. The evolution of hydrogen gas is dependent on several factors, namely, temperature, pH, proportion and particle size of ingredients and mixing conditions. The essential water split reaction is as follows:

$$2Al + 6H_2O \rightarrow 2Al(OH)_3 + 3H_2 \{9 > pH > 4\} \quad (2)$$

The key feature of the present invention is that the reactant system is able to sustain the aluminum-assisted water split reaction, equation (2), but in neutral, or close to neutral conditions, e.g. in tap water.

If tap water is used (as in plurality of experiments described below) the only products of reaction (2) (i.e. after completion of the reaction) are aluminum oxide(s), aluminum hydroxide(s) and hydrogen. Aluminum oxide and hydroxide are readily recyclable back to aluminum metal through the well-known electrolysis process. The hydrogen, thus generated, can be subsequently oxidized to water in the fuel cell. The resulting water can be feed back to sustain the water split reaction (2). The life-cycle loop for hydrogen generation through aluminum assisted water split is thus closed with no impact on the environment, especially if electrolysis of alumina (to produce Al) is performed using hydroelectric or other renewable form of energy.

The principal discovery disclosed in the present invention is that the reaction (2) is sustained, i.e. passivation layer of reaction products does not hinder the reaction, if the reacting aluminum metal is in contact with externally supplied non-metal (ceramic) such as aluminum oxide(s) or hydroxide(s). Thus, a composite material comprising mechanical mixture of aluminum metal (Al) and aluminum oxide(s) or hydroxide(s), when submerged in water, continuously produces hydrogen gas. The reaction proceeds for the mass ratio of AM to the oxide(s) or hydroxide(s) varying over the whole range, from a few percent to up to 99% of the additive(s). Similarly, the reaction proceeds in a wide range of acidity/alkalinity (pH) of water, e.g. 11>pH>2, and water temperature, e.g. from about 10° C. to 90° C. Although the reaction proceeds faster at elevated temperatures, water acidity/alkalinity in the range 9>pH>4 has relatively weak effect on the reaction rate. The phenomenon has been demonstrated reproducibly, as illustrated in the following figures and examples.

The system disclosed in the present invention may accelerate introduction of hydrogen-derived power to consumer electronics (e.g. laptop computers) or transportation. For example, according to reaction (2) the aluminum assisted water split leads to generation of about 1.2 cubic meters of hydrogen (at standard conditions) out of 1 kg of aluminum reacting with water. This is about 30% more than the amount of hydrogen produced through rather complex process of reforming 1 kg of methanol, which is one of the methods proposed for supplying hydrogen to fuel cells. More importantly, there is no carbon dioxide/ monoxide produced in aluminum assisted water split reaction. This is especially important for application in fuel cells, where small amount of CO contaminant in hydrogen may poison the additive and make the cell dysfunctional. The "storage ratio", i.e. the mass ratio of the hydrogen generated to the metal reactant, is therefore about 11%, substantially more than any other currently known means of on-board hydrogen storage, e.g. through metal hydrides (the mass of water is neglected in the storage ratio as it may be partially re-circulated within the system, or replenished through abundant distribution system in place). As aluminum, aluminum oxide and aluminum hydroxide are the safest materials known to humanity (e.g. are commonly used in food, drug, cosmetics etc. products), the novel process promises to be safe and manageable by simple means.

BRIEF DESCRIPTION OF DRAWINGS

The drawings illustrate specific embodiments of the invention, but should not be construed as restricting the spirit or scope of the invention in any way.

FIGS. 1, 2 and 3 present the amount of hydrogen, in cubic centimeters (cc), produced in 1 hr in the water split reaction out of aluminum+aluminum-ceramic additive composite systems, as a function of additive amount, reaction temperature, and pH, respectively. All samples in FIGS. 1–3 were produced in the same way, i.e. boehmite (calcined at 700° C.) was combined with appropriate amount of Al powder (99% Al, 80 μm average particle size), Spex milled for 10 min, and pelletized at 5000 psi pressure. For FIG. 1 the constants include T=50° C. and pH=6.5. For FIG. 2 the constants include amount of additive=2 wt %, and pH=6.5. For FIG. 3 the constants include T=50° C. and amount of additive=20 wt %.

FIG. 4 additionally illustrates several typical curves of hydrogen accumulation over the I hr reaction time, for the experiments included in Table 1.

DETAILED DESCRIPTION OF INVENTION

Extensive experiments were performed to test the feasibility of hydrogen generation from water, and to identify the factors affecting this process. Two critical parameters monitored were (i) total volume of $H_2$ generated per unit weight of the aluminum powder (i.e. conversion efficiency) and (ii) rate of $H_2$ release. The factors affecting these two parameters have been identified to be as follows:

(a) Type and concentration of the component materials, in particular aluminum and ceramic additives;

(b) Mixing, grinding and pelletization methods to bring the component materials (i.e. aluminum and ceramic additives) to physical contact;

(c) Reaction temperature, (d) Water acidity/alkalinity (pH).

The following is description of the experimental programs that tested the above variables in relationship to the use of metal-ceramic composites for water split reaction to produce hydrogen.

(a) Type and Concentration of the Component Materials

Aluminum powders having five different average particle sizes of 10, 44, 60, 80 and >200 microns ($\mu$m) were used. These powders were of nominal purity i.e., 99% pure Al, except the 60 $\mu$m powder, which was a reagent grade (99.9% Al). Although the nominal particle size was quoted by the supplier, it is noted that there is a large variation in each size grade. The largest grade powder had very coarse particles, perhaps 80% larger than 200 $\mu$m. The additives were aluminum oxides produced by calcining (i.e. heating in air) aluminum hydroxides. Both monohydrate (AlOOH, known as boehmite) and trihydrate of aluminum Al(OH)$_3$ were used for these tests. Several grades of commercially available aluminum oxide were also utilized. There are different crystallographic forms of aluminum oxides, such as $\alpha$, $\gamma$, etc. Both $\alpha$ and $\gamma$ aluminum oxides were used in these tests, but there is no doubt that other forms aluminum oxides when ground and mixed with aluminum metal powder will produce hydrogen gas when added to water. A few tests were also carried out after partially oxidizing the aluminum metal powder in air at 500° C. and also with an aluminum powder which has been exposed to air for at least 25 years.

THE EFFECTS

Effect of the Type of Ceramic Additive

The effects of different type of additives are summarized in Table 1, in terms of the amount of H$_2$ released from the reactor after 1 hr of reaction, the maximum rate of hydrogen release, and the time to the moment of maximum rate of hydrogen release (measured from introduction of the metal-ceramic composite pellet into the water. All samples were Spex Milled for 10 min, with 20 wt % additive ceramic powder (the balance 80 wt % was the 80 $\mu$m average particle size Al powder). The mixed powders were pelletized under 8000 psi. The pellets weigh about 2 g and the testing water temperature was 50° C. Tests in water are carried out at the pH range 5.8 to 7.5 (typical fluctuations of tap water).

"Boehmite B" stands for aluminum monohydrate from Condea Chemicals, calcined at 500° C. (B500) or 700° C. (B700). Similarly, "Boehmite C" stands for aluminum monohydrate from Alcoa (Baymal) calcined at 700° C. (C700), or used in as-received state (C). Alphabond is a trade name for calcined gibbsite (aluminum trihydrate). Effectively, all the tested additives are alumina or hydrated alumina (aluminum hydroxide). The kinetics of H$_2$ generation data are also illustrated in FIG. 4.

All the tested aluminas, which have a tendency to hydrate in water, activate the water split reaction to generate hydrogen in the aluminum-assisted water split reaction. Those aluminas, which were already partially or fully hydrated, e.g. because of low calcinations temperature (or no calcinations) were less effective in assisting the water split reaction, however, these still produced hydrogen from water. The most effective additive appears to be the boehmite calcined at 700° C.

Aluminum Metal Particle Size Effect

It has been observed that after Spex milling all aluminum particles larger than about 30 $\mu$m got flattened and well mixed through repeated plastic deformation with the ceramic additive. Eventually, the composite particles agglomerated to very similar sizes, in the range of 70 to 100 $\mu$m. There was no substantial reduction of size of the particles. For the largest (>200 $\mu$m) particles there is flattening observed but not much mixing with the ceramic powder. That is the reason why the amount of hydrogen generated is similar for all particle sizes up to 80 $\mu$m. And there is less production of hydrogen with largest aluminum >200 $\mu$m particles.

Effect of the Concentration of Ceramic Additive

For these tests aluminum metal having the average particle size 80 $\mu$m was used along with boehmite B700 as additive. All mixtures were Spex-milled for 10 min and pelletized under 5000 psi to about 1 g pellet. The water reaction tests were carried out at 50° C. at a pH between 5.8 and 7.5. The results are shown in Table 2 and also plotted in FIG. 1. All data are normalized as generation of hydrogen per one gram of aluminum metal. There is a linear correlation of hydrogen generation with the increase in additive. As the additive concentration is increased in the mixture more hydrogen gas is generated, per unit quantity of metal (Al).

(b) Mixing, Grinding and Pelletization Methods

The goal of mixing/milling of the component powders was to produce a homogenous composite with multiple interfaces including the metal and ceramic in contact. In this experimental program the following methods of mixing the metallic component (powder) with ceramic component (powder) have been tried: hand grinding i.e., mixing in a mortar-pestle, ball milling and high impact mixing and grinding (Spex milling). Another possible method of high energy mixing and grinding is attrition milling. However, the later method has not been used in this test program. Most of the tests were performed using the Spex-milled powder.

THE EFFECTS

Type of Mixing Effects

In any mechanical mixing (which involves also grinding) it is expected that the particle size of the initial components in the mixture will have an influence on final state of the mixed powder, unless the mixing effect eliminates the variability of the initial particle size of powder. It is also expected that the type of equipment used for such mechanical mixing will have a bearing on the final state of the mixed powder. Hand mixing and grinding aluminum metal and oxide powders in a mortar-pestle is laborious and produced hydrogen in amount less than 50% of that obtained from using the mixed powder from the Spex mill. Ball milling using alumina balls was also time consuming as it took a few hours to mix the composite powder. At least 50 grams of powder had to be used per charge. Spex milling, which is high impact mixing/grinding with alumina balls, was used in almost all experimental tests.

Effect of Time of Mixing

The effect of time of mixing in the Spex mill is shown in Table 3. All samples are Spex milled with alumina balls with 20 wt % boehmite C additive calcined at 700° C. The water temperature was 50° C. and pH was in the range 5.8 to 7.5. After about 10 minutes of milling no effect of longer milling time can be seen on the hydrogen release from water.

Regrinding Effect

The aluminum-assisted water split reaction leads to precipitation of aluminum hydroxide, according to reaction (3). The way this non-soluble product of reaction distributes throughout the system affects the reaction progress. For Al only reacting with water, the reaction products precipitate on Al surface, and eventually form a passivation layer which stops any further reaction (this is why Al does not substantially corrode under normal conditions). As disclosed in the present invention, the Al-ceramic composites do not appear to passivate through substantial portion of the water split reaction. It is anticipated that the reaction products (hydroxides) preferentially nucleate and deposit on the ceramic additives (e.g. alumina) supplied to the system through composing with Al. As the reaction proceeds however, we observe slow-down of the reaction rate (as measured through hydrogen release rate), and eventually the reaction ceases after a few days. It is anticipated that the buildup of the reaction products, albeit on the pre-existing ceramic additives, eventually screens access of water to the fresh Al surface. In order to test this hypothesis, all the solids (i.e. the products and remaining reactant-Al) were re-ground for 10 min after the initial 1 hr of reaction, to exposed the un-reacted Al. The experimental conditions were the same as that used for the effect of pH measurements. The water split reaction with the original pellet generated 147 cc of hydrogen (per 1 g of Al) after 1 hr reaction. The remaining solids were re-ground and exposed to water again to release 226 cc of hydrogen (per 1 g of Al). The solids remaining from this second reaction were re-ground once again and the test was repeated. This last test generated farther 368 cc of hydrogen (per 1 g of Al). It is therefore observed that after each successive grinding of the same pellet more hydrogen gas can be produced. This means that if grinding during the reaction with water can expose fresh clean surface of aluminum particles, more hydrogen can be generated, until all aluminum is consumed.

Pelletization

For easy handling of the composite powder, the mixed powder was pelletized into either one gram or two grams pellets. These were about 0.5 inch (2.25 cm) in diameter and pelletized under either 5000 or 8000 psi. Pelletization has both advantage and disadvantage. For example, it is easy to insert a pellet inside the reactor full of water, which has to be enclosed to determine the amount of gas released. On the other hand, pressing the powder in a die made the pellet dense which restricted water penetration into the pellet for water split reaction to take place. Thus, it is noted that more the pressure applied on the die during pelletization, less the amount hydrogen gas produce under identical testing conditions.

(c) Reaction Temperature

It is obvious for those skilled in the art that the water split reaction will progress faster at higher temperatures. The objective of this testing program was to determine the increase of hydrogen release from aluminum-ceramic composites exposed to water. All samples prepared using 80 $\mu$m Al powder were Spex-milled for 10 min with 20 wt % boehmite B700 (i.e. calcined at 700° C.). All specimens weighing~1 g were pressed into pellets under 5000 psi. The water temperature varied from 30° C. to 70° C. and pH was maintained in the range 5.8 to 7.5 (tap water).

THE EFFECTS

The effects of reaction temperature on Al-assisted water split reaction are compiled in Table 4, and FIG. 2. The amount of hydrogen gas generated is normalized as per gram of aluminum metal. The temperature has a significant effect on the generation of hydrogen. The effect becomes less significant above 60° C.

(d) Water Acidity/alkalinity

It is obvious for those skilled in the art that reactivity of aluminum depends on acidity/alkalinity of water. In particular, it is known that pure Al will corrode in very acidic (pH<1) and very alkaline (pH>11) environments, with release of hydrogen. It is also known that Al is immune to water in intermediate range of acidity/alkalinity close to neutral (4<pH<9) due to passivation property of Al. The objective of this experimental program was to determine the reactivity of Al-ceramic composites in water of wide range of acidity/alkalinity, in relation to reactivity of Al alone in similar systems.

THE EFFECTS

Water Acidity/alkalinity Effects for Al-Ceramic Composites

All samples using 80 $\mu$m Al powder were Spex-milled for 10 min with alumina balls with 20 wt % boehmite B700 (additive boehmite calcined at 700° C.). All specimens weighing~1 g were pressed into pellets under 5000 psi. The water temperature was 50° C. The data are compiled in Table 5, and also in FIG. 3, together with the data for pure Al (refer to the following section). For the pH range of 4.7 to ~10.5 the amount of hydrogen release for Al-ceramic composite pellets is in the range of about 131 to 184 cc (per 1 g of Al), at least one order of magnitude more than for pure Al in the same range of pH (refer to FIG. 4 and the following Table 6). For pH>11 the total amount of hydrogen formed is increased. This shows that the caustic solution starts to corrode the layer of hydroxide formed on the metal surface. The same phenomenon occurs with pure aluminum metal, as shown in later experiments, refer to the following section, Table 6 and FIG. 4. In all tests it was noted that pH value of the water slightly increased (by ~1.0 pH) at the end of the reaction, specially in the range of 5.5 to 9.5. These results are compared with pure aluminum metal (80 $\mu$m) fabricated under identical conditions (except without the additive), in FIG. 4.

Water Acidity/alkalinity Effects for Pure Al Powders

In order to distinguish between the role of aluminum oxide blended with Al, and pure Al, in producing hydrogen from water, a series of experiments were carried out with the Al powder itself. The loose 80 $\mu$m powder, as received, was added to water at 50° C. at pH=7 ("neutral conditions"). Subsequently a pellet was produced from the same powder under 8000 psi and exposed to water at 50° C. Finally, the same powder was Spex-milled for 10 min, pelletized and exposed to water at 50° C. In addition, similar experiments were repeated where pH of the water was changed with caustic soda to "highly caustic" conditions at pH=11.5–12 and also made acidic adding HCl in water to lower the pH down to 1.5. The data are compiled in Table 6, and also included in FIG. 4.

The "as received" aluminum powder does not produce any hydrogen in contact with neutral pH water. Although milling the same powder seems to expose some of the passivated Al surface to make it available for the reaction, the passivation film is quickly restored, leading to very small release of hydrogen from this system. The caustic conditions do cause substantial reaction with pure Al, as expected. These results, together with the data from Table 5, are mapped in FIG. 4 to illustrate the effect of alumina additive on water split reaction in a range of pH values from 1.5 to 12.0.

Summary of the Effects of Variables on Al-Assisted Water Split Reaction

In summary, it has been proven beyond doubt that in every experimental tests that hydrogen is generated when the metal-ceramic powder, either in the pelletized form or as loose powder, is submerged in water, both at ambient temperature (~20° C.) or at elevated temperature up to 90° C., at neutral or close to neutral pH. The necessary condition for the reaction to progress at neutral or close to neutral pH is that the aluminum and ceramic additive are in physical contact during the reaction.

The rate of generation of gas and the total amount of gas produced depend on several factors:

1. The maximum rate of gas release depends on (i) nature of milling (ii) type of ceramic additive (iii) temperature of reaction and (iv) pH of the water.
2. The total amount of gas release does not vary significantly with different type of alumina ceramic additive, produced from different aluminum hydroxides, (or aluminum hydroxide) but significantly depends on pH of the water.
3. Temperature has a significant effect both on the rate of $H_2$ generation and the total amount of the gas produced.
4. pH has a very strong effect on both the rate of gas release and the total amount of $H_2$ produced. However, below pH=10 the effect is not noticeable. It has been known that both caustic soda and HCl attack and corrode aluminum metal producing hydrogen gas. Both caustic soda and HCl is dangerous to human health and damaging to environment.
5. The key feature of the investigated systems is the ability to generate substantial amount of hydrogen through water split reaction at neutral pH (pH=6–7).

EXAMPLES OF SPECIFIC EMBODIMENTS OF THE INVENTION

The following examples clearly illustrate the specific embodiments of the invention, but should not be construed as restricting the spirit or scope of the invention in any way. These example processes to produce hydrogen in Al-assisted water split reaction used Al powder blended with variety of ceramic powders, generally aluminium oxide or hydroxide, in variety of forms and morphologies, as described in the preceding sections. The blending method is critical to initiate and sustain the water split reaction. The high energy blending techniques which produce multiple metal-ceramic interfaces are more effective. The principal process variables included mass ratio of the Al to the ceramic, methods and time of blending the powders, temperature and pH of reaction environment. Reference tests were performed with the separate powders of Al and ceramic, in a variety of environments. The principal parameter measured in all the tests was the total amount of hydrogen (cc) released after 1 hr of reaction, normalized to 1 g of Al reactant. Additionally, accumulation of hydrogen during the 1 hr reaction was monitored in short time intervals (i.e. 1 min) to determine variations in the reaction rates. These data are provided in the following examples, and illustrated in FIG. 1–4.

Example 1

Water-Split Reaction for the Reference System: Al Powder Only

The Al powder (99% Al, 80 μm average particle size) was pelletized at 8000 psi and the 1 g pellet dropped to tap water at approximately pH=6 and T=50° C. There was no hydrogen generation after 1 hr test.

Example 2

Water-Split Reaction for the Reference System: Al Powder Only

The Al powder (99% Al, 80 μm average particle size) was Spex-milled for 15 min., pelletized at 8000 psi and the 1 g pellet dropped to tap water at approximately pH=6 and T=50° C. The total amount of hydrogen released from the reactor after 1 hr was 10 cc per 1 g Al.

Example 3

Water-Split Reaction for the Reference System: Oxidized Al Powder

The Al powder (initially 99% Al, 80 μm average particle size) was partially oxidized for 72 hr, which resulted in 0.05% weight increase due to formation of aluminum oxide layer on its surface. The partially oxidized powder was Spex-milled for 15 min., pelletized at 8000 psi and the 1 g pellet dropped to tap water at approximately pH=6 and T=50° C. The total amount of hydrogen released from the reactor after 1 hr was 7 cc per 1 g Al.

Example 4

Water-Split Reaction for the Composite System: Mixed Al+$Al_2O_3$

The Al powder (99% Al, 80 μm average particle size, 1.6 g), and $Al_2O_3$ powder (alpha-alumina, 0.2 μm average particle size, 0.4 g) was loosely mixed without generation of multiple contacts between metal and ceramic, for 10 min., pelletized at 8000 psi and the pellet dropped to tap water at approximately pH=6 and T=50° C. There was no hydrogen generation after 1 hr test.

Example 5

Water-Split Reaction for the Composite System: Milled Al–$Al_2O_3$

The Al powder (99% Al, 80 μm average particle size, 1.6 g), and $Al_2O_3$ powder (alpha-alumina, 0.21 μm average parti 0.4 g) was Spex-milled for 10 min., pelletized at 8000 psi and the pellet dropped to tap water at approximately pH=6 and T=50° C. The total amount of hydrogen released from the reactor after 1 hr was 200 cc, equivalent to 125 cc/1 g of Al.

Example 6

Water-Split Reaction for the Composite System: Al-Calcined Boehmite

The Al powder (99% Al, 80 μm average particle size, 1.6 g), and AlOOH powder calcined at 700° C. (0.4 g) was Spex-milled for 10 min., pelletized at 5000 psi and the pellet dropped to tap water at approximately pH=6 and T=50° C. The total amount of hydrogen released from the reactor after 1 hr was 296 cc, equivalent to 185 cc/1 g of Al. By decreasing the temperature to 40° C., the $H_2$ yield was 110 cc/1 g of Al, whereas at 60° C., the $H_2$ yield was 220 cc/1 g of Al. If the amount of Al in the pellet was 1 g and amount of calcined boehmite in the pellet was 1 g (50 wt %), the $H_2$ yield was 515 cc/1 g of Al, for the T=50° C. bath. If the amount of Al in the pellet was 0.5 g and amount of calcined boehmite in the pellet was 1.5 g (75 wt %), the $H_2$ yield was 650 cc/1 g of Al, for the T=50° C. bath. If the amount of Al in the pellet was further decreased to 10% of the total amount of the composite (calcined boehmite in the pellet is 90 wt %), the $H_2$ yield was 870 cc/1 g of Al, for the T=50° C. bath.

TABLE 1

Effect of type of additive on hydrogen generation through aluminum assisted water split reaction.

| Additive in Al | $H_2$ release after 1 hr (cc/1.6 g Al) | Max Rate of $H_2$ release (cc/min) | Time to max Rate of $H_2$ Rel. (min) |
| --- | --- | --- | --- |
| Boehmite B500 | 86 | 5 | 5 |
| Boehmite B700 | 282 | 12 | 14 |
| Boehmite C700 | 290 | 14 | 16 |
| Alphabond | 250 | 15 | 9 |

TABLE 1-continued

Effect of type of additive on hydrogen generation through aluminum assisted water split reaction.

| Additive in Al | H$_2$ release after 1 hr (cc/1.6 g Al) | Max Rate of H$_2$ release (cc/min) | Time to max Rate of H$_2$ Rel. (min) |
|---|---|---|---|
| Hydrated Al$_2$O$_3$ | 146 | 5 | 16 |
| Al$_2$O$_3$ 0.2 μm | 201 | 10 | 18 |
| Boehmite C | 194 | 7 | 16 |

TABLE 2

Effect of the amount of additive on hydrogen generation through aluminum assisted water split reaction.

| Amount of Additive (wt %) | H$_2$ release after 1 hr (cc/1 g Al) |
|---|---|
| 5 | 7 |
| 10 | 105 |
| 15 | 125 |
| 20 | 206 |
| 30 | 245 |
| 40 | 320 |
| 50 | 515 |
| 75 | 650 |
| 90 | 870 |

TABLE 3

Mixing time effect on hydrogen generation through aluminum assisted water split reaction.

| Mixing Time (min) | H$_2$ release after 1 hr (cc/1 g Al) |
|---|---|
| 5 | 178 |
| 10 | 240 |
| 15 | 225 |
| 20 | 250 |
| 30 | 246 |

TABLE 4

Water temperature effect on hydrogen generation through aluminum assisted water split reaction.

| Water Temperature (° C.) | H$_2$ release after 1 hr (cc/1 g Al) |
|---|---|
| 30 | 20 |
| 40 | 110 |
| 50 | 185 |
| 60 | 220 |
| 70 | 224 |

TABLE 5

Water pH effect on hydrogen generation through aluminum assisted water split reaction.

| Water pH | H$_2$ release after 1 hr (cc/1 g Al) |
|---|---|
| 1.5 | 170 |
| 2.3 | 175 |
| 3.7 | 182 |
| 4.7 | 198 |
| 5.5 | 197 |
| 6.5 | 176 |
| 9.5 | 170 |
| 10.5 | 178 |
| 11.0 | 198 |
| 11.5 | 333 |
| 12.0 | 450 |

TABLE 6

Water pH Effect on pure Al (80 μm) at 50° C.

| Exp. # | Water pH | H$_2$ release after 1 hr (cc/1 g Al) |
|---|---|---|
| Milled & Pressed Powder | 1.5 | 20 |
| Milled & Pressed Powder | 3.5 | 16 |
| Loose Powder As-received | 7.0 "Neutral" | No gas (0 cc) |
| Pressed Powder As-received | 7.0 "Neutral" | No gas (0 cc) |
| Milled & Pressed Powder | 7.0 "Neutral" | 20 |
| Loose Powder As-received | 11.5 "Highly Caustic" | 113 |
| Milled & Pressed Powder | 11.5 "Highly Caustic" | 160 |
| Pressed Powder As-received | 12.0 "Highly Caustic" | 267 |

REFERENCES

1. U.S. Pat. No. 5,817,157, Checketts, Oct. 6, 1998
2. U.S. Pat. No. 5,728,464, Checketts, Mar. 17, 1998
3. U.S. Pat. No. 4,356,163, Davidson, Oct. 26, 1982
4. U.S. Pat. No. 5,514,353, Adlhart, May 7, 1996
5. U.S. Pat. No. 3,716,416
6. U.S. Pat. No. 5,593,640, Long, et al., Jan. 14, 1997
7. U.S. Pat. No. 5,510,201, Werth, Apr. 23, 1996
8. U.S. Pat. No. 4,988,486, Harris, et al., Jan. 29, 1991
9. U.S. Pat. No. 5,143,047, Lee, Sep. 1, 1992
10. U.S. Pat. No. 5,494,538, Kirillov, et al., Feb. 27, 1996
11. U.S. Pat. No. 4,600,661, Dohnomoto, et al., Jul. 15, 1986
12. U.S. Pat. No. 4,072,514, Yasaka, et al., Feb. 7, 1978
13. U.S. Pat. No. 4,064,226, Becker, et al., Dec. 20, 1977
14. U.S. Pat. No. 3,985,865, Hohne, Oct. 12, 1976
15. U.S. Pat. No. 3,966,895, Wilhelm, Jun. 29, 1976
16. JP. Pat. No. 1,061,301
17. U.S. Pat. No. 4,072,514, Suzuki, Feb. 7, 1978
18. FR Pat. No. 2,465,683

What is claimed is:

1. A process of producing hydrogen, which comprises exposing water to a ceramic-metal composite, selected from the group consisting of:

(a) aluminum oxide (and/or oxides) and aluminum;

(b) hydrated aluminum oxide (and/or hydroxides) and aluminum; and (c) combination(s) of (a) and (b) above.

2. A process as claimed in claim 1 wherein the composite contains from about 1% to 99% wt. aluminum, the balance being aluminum oxide(s).

3. A process as claimed in claim 1 wherein the composite contains from about 1% to 99% wt. aluminum, the balance being hydrated aluminum oxide(s) or aluminum hydroxide(s).

4. A process as claimed in claim 1 wherein the reaction is conducted at a pH between about 4 and 9.

5. A process as claimed in claim 1 wherein the reaction is conducted at a pH between 5 and 8.

6. A process as claimed in claim 1 wherein the reaction is conducted at a temperature between about 10° C. and 90° C.

7. A process as claimed in claim 1 wherein the composite is made up of particles between about 0.01 $\mu$m and 1000 $\mu$m.

8. A process as claimed in claim 1 wherein the metal and ceramic particles of the ceramic-metal composite are combined such that they are in physical contact with one another, and with water.

9. A process as claimed in claim 1 wherein passivation of aluminum during reaction with water does not hinder hydrogen generation.

* * * * *